United States Patent [19]

Giacomelli

[11] 4,443,074
[45] Apr. 17, 1984

[54] METHOD FOR MAKING REINFORCED PLASTICS MATERIAL EYEGLASS FRAMES

[75] Inventor: Renato Giacomelli, Piano di Follo, Italy

[73] Assignee: MORWEN S.r.l., Piano di Follo, Italy

[21] Appl. No.: 121,443

[22] Filed: Feb. 14, 1980

[30] Foreign Application Priority Data

May 3, 1979 [IT] Italy .................. 21494/79[U]
Jun. 20, 1979 [IT] Italy .................. 23751 A/79

[51] Int. Cl.³ .............. B32B 31/00; G02C 13/00
[52] U.S. Cl. ........................... 351/178; 156/257
[58] Field of Search ............ 351/178, 147, 41, 86, 351/158; 2/14; 156/257

[56] References Cited

U.S. PATENT DOCUMENTS

| | | | |
|---|---|---|---|
| 1,386,068 | 8/1921 | Maynard | 351/178 X |
| 1,494,628 | 5/1924 | Ravenelle | 351/178 X |
| 1,568,629 | 1/1926 | Schumacher et al. | 156/257 X |
| 2,719,565 | 10/1955 | Wolff | 351/178 X |
| 2,985,556 | 5/1961 | Rowland | 351/178 X |
| 2,997,917 | 8/1961 | Baer | 351/178 X |
| 3,288,666 | 11/1966 | Dacey | 351/178 X |
| 3,649,106 | 3/1972 | Hirschmann, Jr. | 351/178 X |
| 4,222,640 | 9/1980 | Bononi | 351/41 X |

FOREIGN PATENT DOCUMENTS

2459311  7/1975 Fed. Rep. of Germany ...... 351/178

Primary Examiner—John K. Corbin
Assistant Examiner—Scott J. Sugarman
Attorney, Agent, or Firm—Karl F. Ross; Herbert Dubno

[57] ABSTRACT

A method for making reinforced eyeglass frames of plastic material comprises the steps of providing at least a plastic plate, forming therein a groove of predetermined configuration, placing a metallic reinforcing blade in the groove, sealing the groove to permanently embed the reinforcing blade therein and cutting the plate adjacent the metallic reinforcing blade along the profile of the predetermined configuration.

5 Claims, 31 Drawing Figures

METHOD FOR MAKING REINFORCED PLASTICS MATERIAL EYEGLASS FRAMES

FIELD OF THE INVENTION

The present invention relates to an improved method of making eyeglass frames of plastic material, and, more particularly, to an improved method of making reinforced plastic eyeglass frames.

BACKGROUND OF THE INVENTION

Several methods are known for making complete plastic eyeglass frames having the front portion thereof strengthened internally by a continuous metal blade member embedded in the thickness of the contour of the glass holding seats and in the thickness of the nose bridging portion.

These known methods, however, are not completely satisfactory.

In fact, the placing, according to the conventional manufacturing methods, of the metal blade in the glass holding seats formed in the body of the front portion of the eyeglass frame generally involves adoption of special and frequently intricate techniques, and the use of specifically designed tools, such as special clamping devices, abutting planes and the like, which in addition to remarkably increasing the cost, require rather prolonged machining times, with a consequent reduction in the output.

Furthermore, these known methods do not permit an easy production of plastic eyeglass frames allowing for adjustable and swinging nose bearing elements to be simply and quickly fixed thereto, and which permit the eyeglasses to be fitted to a broad range of nose size and shapes.

Finally the known methods provide eyeglass frames of poor flexibility with consequent difficulties in the fitting of the glasses which requires heating the overall eyeglass contour or profile to expand to the glass size and then insertion of the glass, this latter being locked in position as the eyeglass profile cools down. This technique involves both great precision in the making of the glass profile with respect to the related seat in order to exploit the slight profile expansion, for the insertion and the locking, and the practical impossibility for the user of replacing the glasses by others of different types, depending on his needs.

OBJECTS OF THE INVENTION

The principle object of the present invention is to provide a method of making complete plastics material internally reinforced eyeglass frames, which is improved in such a way as to be practical, simple and effective to be quickly carried out and which does not require special and intricate equipment.

It is also an object of the present invention to provide a method of making internally reinforced eyeglass frames starting either from suitable plastics material plates or from frames obtained by injection and free of reinforcing inside elements.

Another object of the present invention is to provide a method of making eyeglass frames effective to be easily fitted to a broad range of nose size and shapes.

Yet another object of the present invention is such a making method effective to provide flexible eyeglass frames in which the glasses can be easily assembled and interexchanged in a simple and quick way and without requiring special tools to be used.

SUMMARY OF THE INVENTION

The aforesaid and other objects, which will become more apparent thereinafter, are achieved in a method for making a reinforced plastic eyeglass frame, having a predetermined configuration, which comprises the steps of:

providing at least a plate of plastic material having a size greater than that of said predetermined configuration;

forming a continuous groove in one surface of this plate, the groove corresponding in shape and size to the predetermined configuration and being of a depth less than the thickness of the plate;

placing a metallic reinforcing member in the groove in this plate;

sealing this groove so as to embed and permanently fix said metallic reinforcing member therein; and cutting said the plate adjacent said metallic reinforcing member and substantially along the profile of said predetermined configuration.

BRIEF DESCRIPTION OF THE DRAWING

Further characteristics and advantages of the method for making reinforced plastics material eyeglass frames, and of the eyeglass frames produced thereby, according to the invention, will become more apparent from the following detailed description of several embodiments thereof, illustrated by way of an indicative and not limitative example in the accompanying drawing.

In the drawing:

FIG. 1a and FIG. $1a_1$ show the main elements (partly in section and partly in perspective) forming the eyeglass frame front portion according to a first embodiment of the invention and illustrating, with FIG. 1b and FIG. $1b_1$, again partly in section and partly in perspective, the groove formed in one plate and provided for housing the reinforcing blade or member;

FIG. 2c and FIG. $2c_1$ are partly in section and partly in perspective, to show the elements superimposed on one another, and FIG. 2d and FIG. $2d_1$ showing those same elements coupled to one another by a sealing operation or the like;

FIG. 3f is another view showing two subsequent perimetrical scribing operations of the eyeglass frame front portion prior to the punching or milling;

FIGS. $4f_1$ to $4f_5$, 4g to $4g_2$ are two views and several cross-sections of the reinforced eyeglass frame front portion according to the invention, respectively in the completing and finishing steps;

SPECIFIC DESCRIPTION

Figures 1A, 1A:
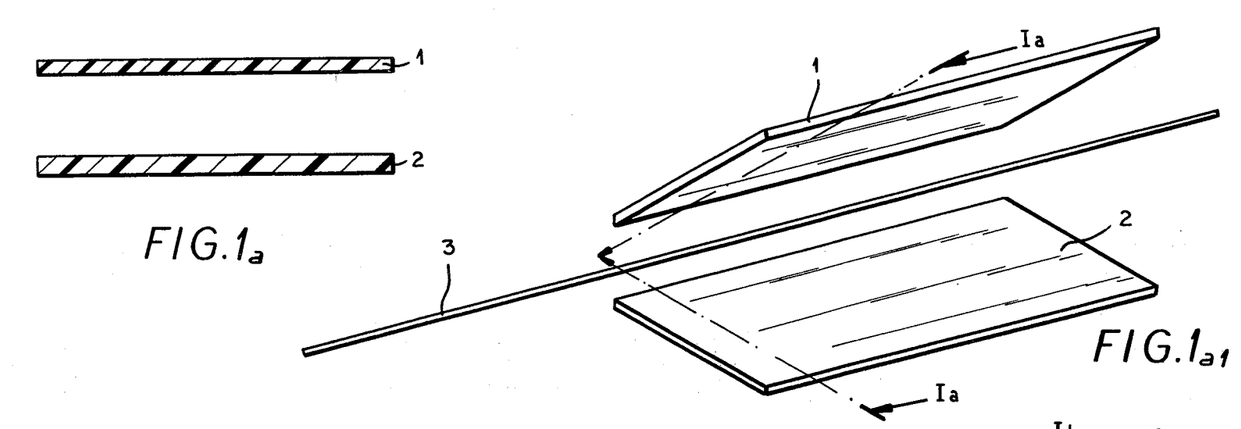

Referring to the figures, and more specifically to FIGS. 1a, 1a$_1$, 1b, and 1b$_1$, the eyeglass frame front portion, according tp a first embodiment of the inventive eyeglass frame making method, is obtained starting from three main elements comprising two plates 1 and 2 made of a suitable plastic material, such as celluloid, cellulose acetate and the like, and having such a size as to form, upon coupling and punching out or shearing, a complete eyeglass frame front portion, and a blade 3, made of a metal alloy, effective to provide an inside reinforcing member.

Figures 1B, 1B:
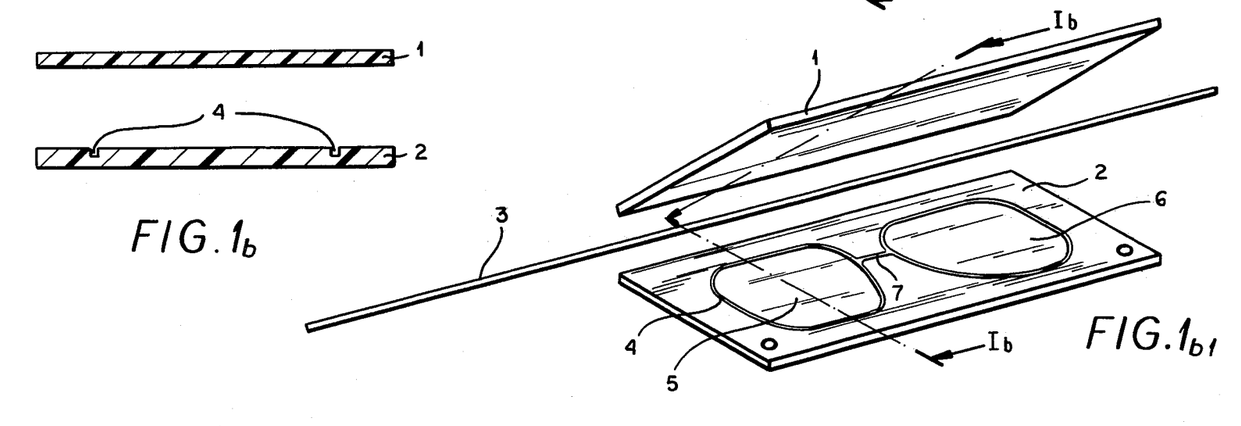

On the plate 2 (FIGS. 1b and 1b$_1$) for example by milling, a continuous groove 4 is formed to extend along a path effective to define the perimeter of the housings or seats 5,6 for the lenses and the nose bridging member 7. In said groove 4 a metal blade or member 3 is inserted, this latter being suitably bent and located in such a way that the free ends thereof, as suitably beveled, form a sliding joint without increasing the thickness of the curved portions of the blade or strip at the nose bridging member.

Figure 2C:
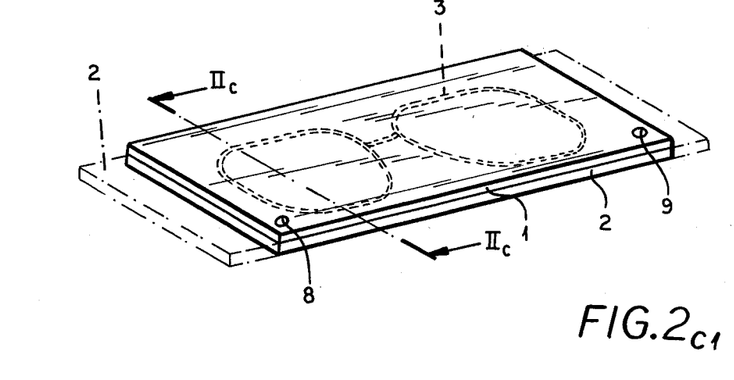
Figure 2C:
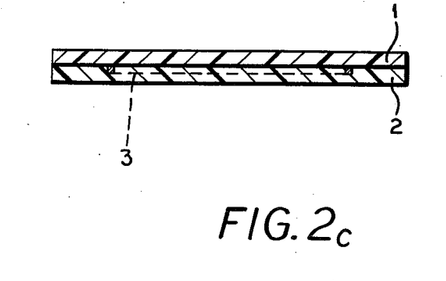
Figure 2D:
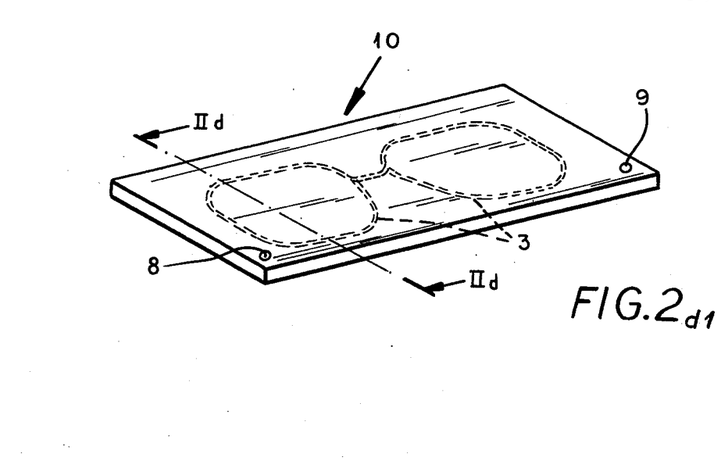

Upon insertion of the reinforcing blade or member 3, the plates 1 and 2 are glued to one another or thermosealed according to known procedures, thereby providing a single internally reinforced plate (FIG. 2c$_1$ or FIG. 2d$_1$).

In order to facilitate the glueing operations and subsequent punching operations of the lens holding openings or rings, the plate 2 (or the opposite one) is of greater size, being possibly provided with centering holes 8–9 effective to pin center the blades on the working table.

Figure 2D:
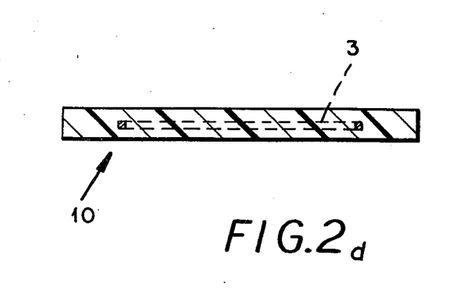

FIGS. 2d and 2d$_1$ show the internally reinforced composite plate 10, ready to be subjected to a milling operation for forming the glass holding openings.

Figure 3E:
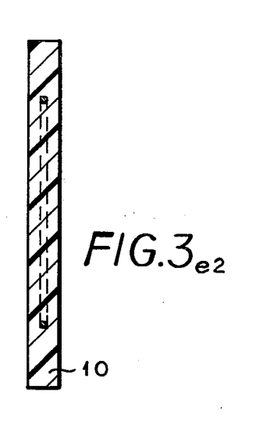
Figure 3E:
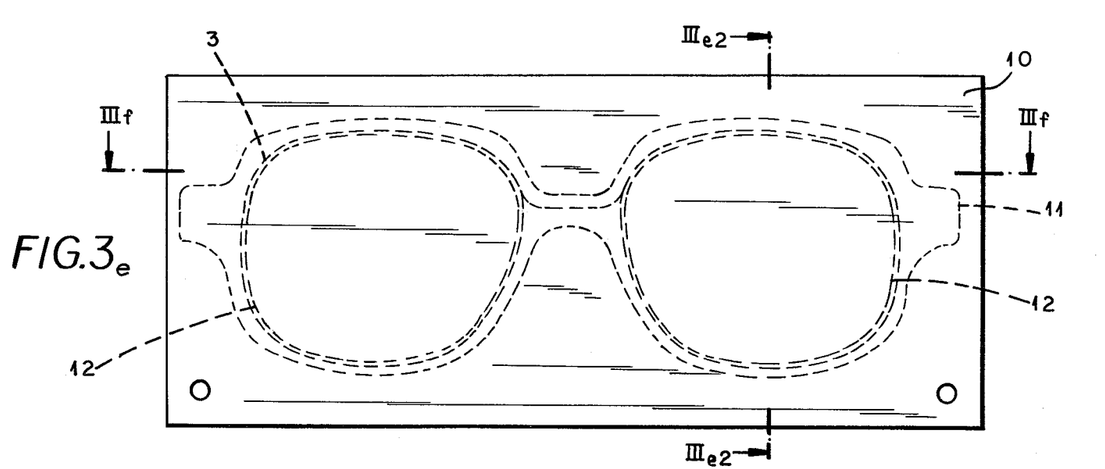
FIGS. 3e, $3e_1$ and $3e_2$ are partly plan and partly sectional views
Figures 3E, 3F:
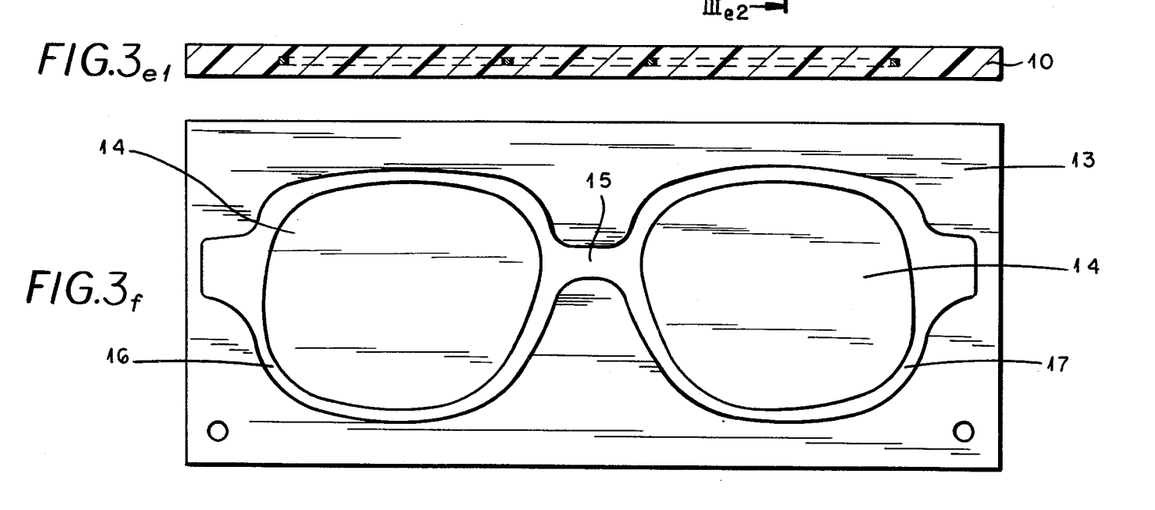

FIG. 3e illustrates the composite plate 10, as internally ribbed, the dashed lines 11–12 representing, respectively, the outside and inside cutting perimeters at which the milling operation is carried out in order to provide, by removing the scrap 13 and 14 (FIG. 3f), the eyeglass frame, when complete, with the nose bridging member 15 and lens holding rings 16–17.

Figures 4F, 4F, 4F, 4F, 4F, 4G, 4G, 4G:
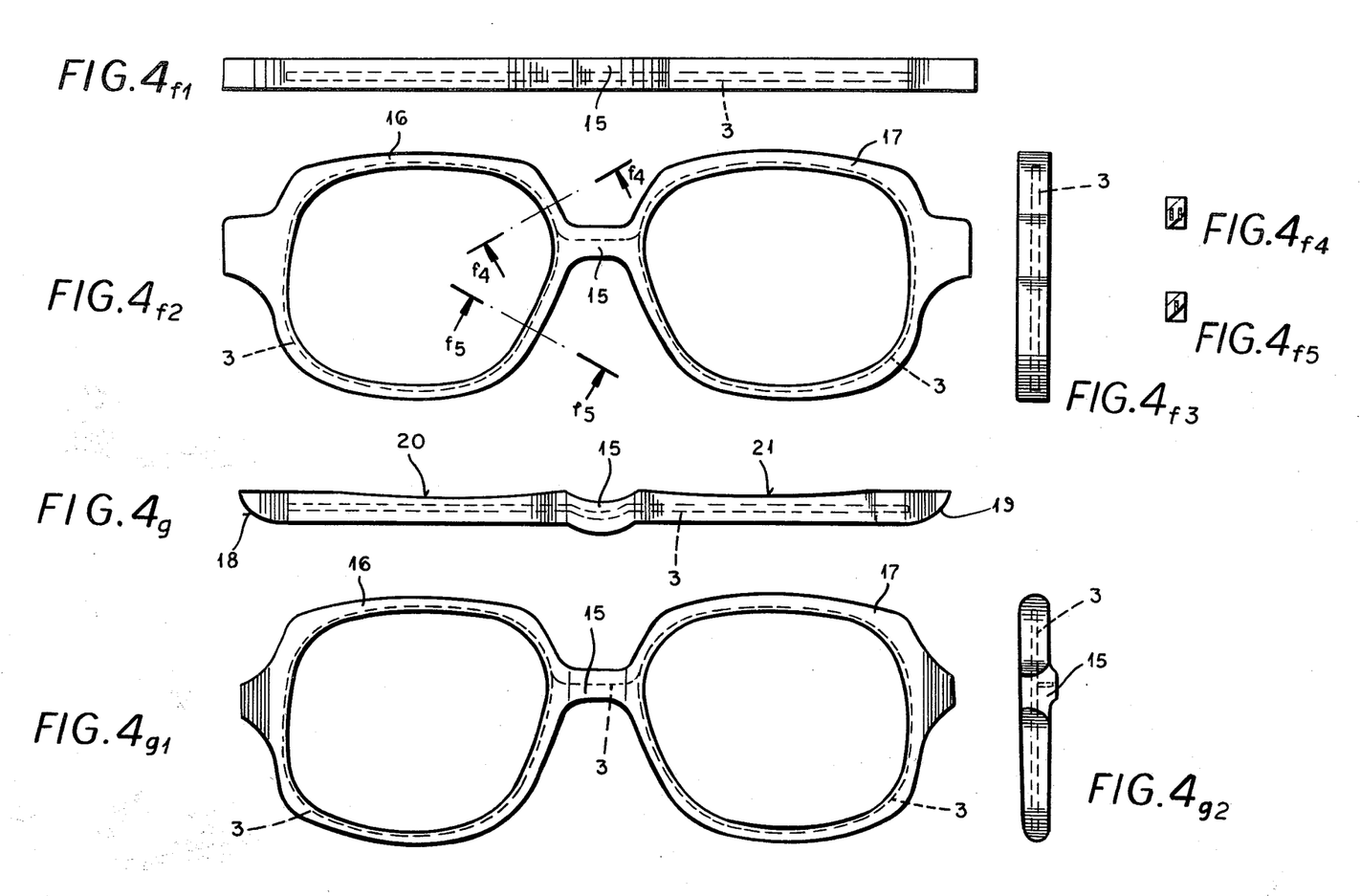

Upon removal of the scrap 13 and 14, the eyeglass frame is as represented in FIG. 4f$_2$, and the related longitudinal view FIG. 4f$_1$ and cross section FIG. 4f$_3$; FIGS. 4f$_4$ and 4f$_5$ are two cross-sectional views taken along the lines f$_4$—f$_4$ and f$_5$—f$_5$ of FIG. 4f$_2$ respectively.

FIG. 4g$_1$ illustrates that the same eyeglass frame can have its nose-bridging member 15 subjected to a heat-pressure bending operation, and wherein the overall peripheral eyeglass frame zone has been subjected to a milling operation in order to remove the sharp edges and shape the eyeglass frame front portion according to conventional profiles; the finishing millings are carried out at surfaces 18, 19, 20, 21 (FIGS. 4g$_1$ and 4g$_2$).

It should be noted that the eyeglass frame obtained according to the invention permits, owing to the continuous reinforcing member therein embedded, slight deformation of the eyeglass frame front portion in such a way as to adapt the front eyeglass frame portion to the user needs and return to the original configuration in the case of an accidental deformation.

Figure 5:
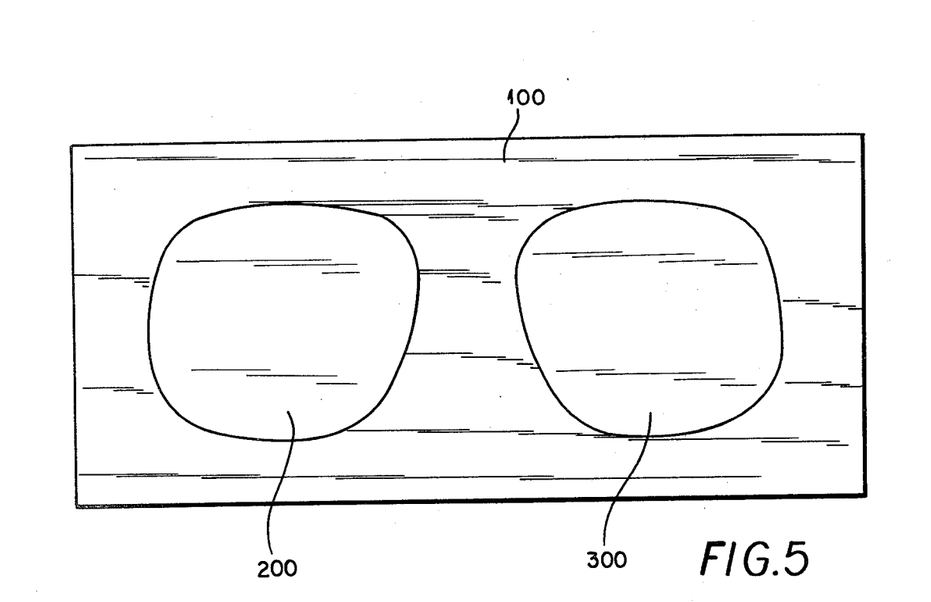
FIG. 5 illustrates a suitably sized plstics material plate effective to be used in a further embodiment of the instant eyeglass frame making method, in which plate has been already carried out the punching of the glass holding openings, according to the first step of this embodiment of the eyeglass frame making method.
Figure 6:
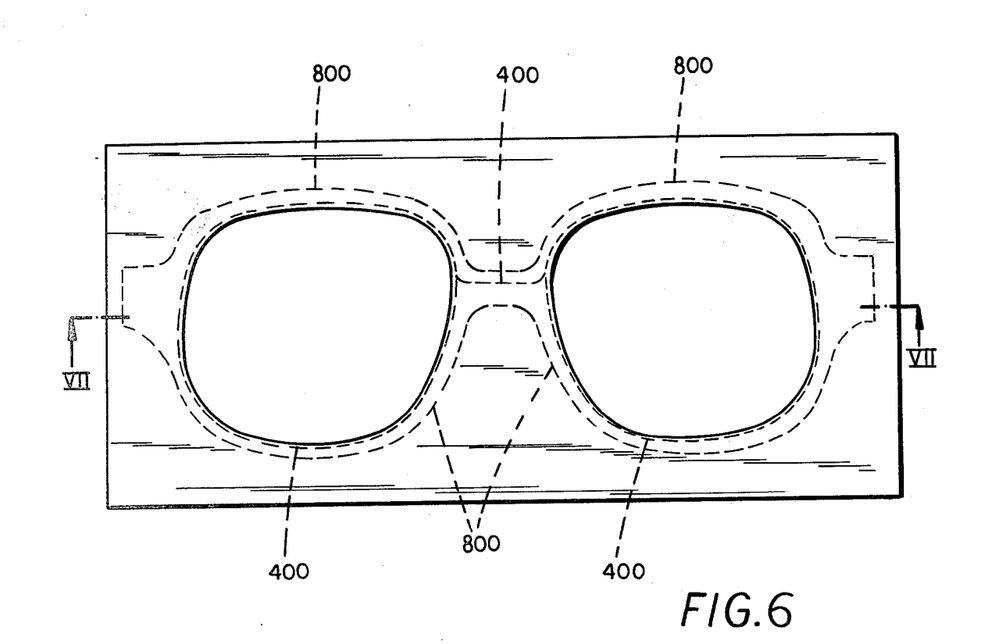
FIG. 6 illustrates that same plate of FIG. 5 thereon have been represented the scribing lines for a reinforcing blade or member and the outside profile defining the final shape of the eyeglass front portion.
Figure 7:
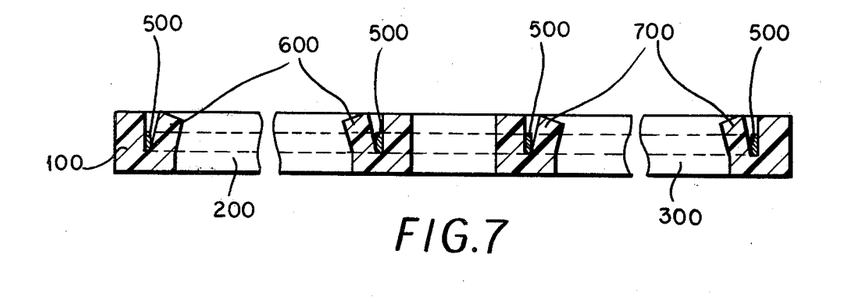
FIG. 7 illustrates, on an enlarged scale, a cross-section view as taken along the line VII—VII of FIG. 6 and showing the scribing step and the step for housing the reinforcing member along said opening profile, according to the invention.

FIGS. 5 to 9 and, more particularly, FIGS. 5 to 7, illustrate a further embodiment of the method according to the invention wherein, for forming the eyeglass frame a single plastic plate 100 is used having a size which can vary according to the desired configuration for the eyeglass frame front portion.

This plate is provided simultaneously, by means of a hollow punch, with the two eyelet openings 200 and 300 effective to provide corresponding seats for holding the lens (not shown). The same plate 100, by means of a further hollow punch corresponding to the first hollow punch but of greater size, is provided a continuous scribing or groove 400, extending through part of the thickness of the profile of the openings 200 and 300 and all along the nose bridging member forming zone; this groove is formed with such a depth and size as to enable a reinforcing blade or member 500 (FIG. 7) to be inserted therein.

The cutting edges of the hollow punch used for forming the groove 4 have a wedge profile, from one side, towards the outside with generatrix lines parallel to the axis and, from the inner side, with generatrix lines so slanted as to provide a slight inwardly directed spreading apart of the openings or cavities 200 and 300, of the edges 600 and 700 formed by the cut, thereby facilitating the insertion of the continuous blade 500 into the cut or groove (FIG. 7).

Upon having located the blade 500, the cut zone of the plate 100 is wetted by a solvent capable of softening the portions spread apart by the cut or groove for a subsequent stable glueing operation thereof.

Upon having softened these portions, two solid templates are inserted into the eyelets or openings 200 and 300, said solid templates having a shape like that of the lens opening, and being provided with a conical projecting portion of a size equal to or slightly greater than that of the eyelets 200–300, so that the templates force the preliminarily softened material outwardly to close the edges 600 and 700 against the other wall of the cut or groove, thereby enclosing the reinforcing blade 500 in the inside of the eyeglass frame.

The cut formed along the nose bridging member (FIG. 6) is sealed by inserting thereinto a plastic block. Upon having closed the groove 400 and as the solvent is evaporated out, the lens receiving bevels are formed by carrying out a milling operation along the inside perimeter of the eyelets 200–300; then, by a further milling operation, the outside of the eyeglass frame front portion is cut and shaped, as is indicated by the dashed line 800 in FIG. 6.

Figure 8:
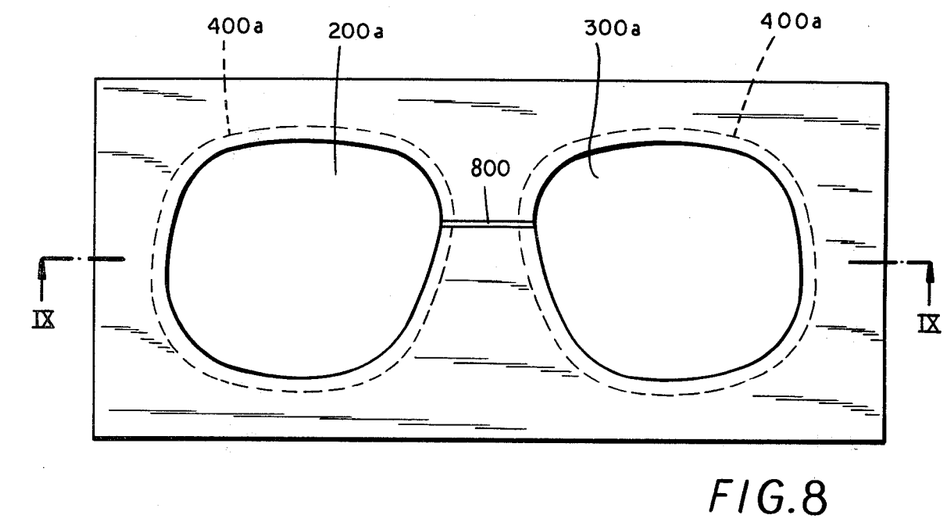
FIGS. 8 and 9 illustrate, respectively by a plan view and a cross-section view, a variation of the operative steps of FIGS. 5 to 7.
Figure 9:
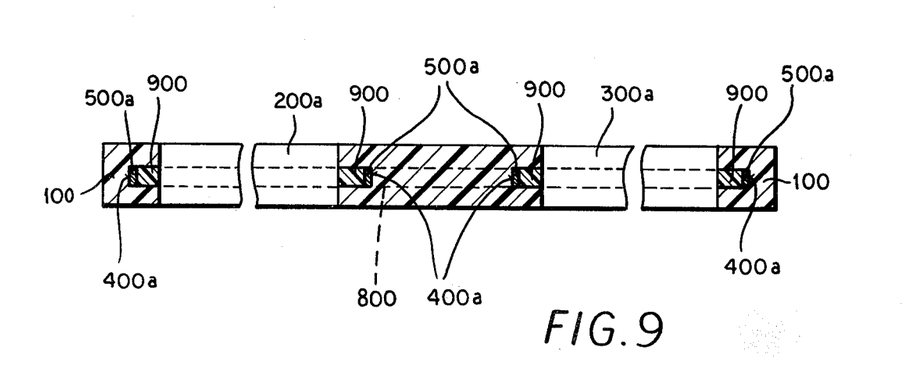

According to a modification of the instant embodiment, as illustrated in FIGS. 8 and 9, the reinforced eyeglass frame portion is obtained by carrying out on said plate 100, milling operations effective to provide the lens eyelet openings or cavities 200a and 300a (FIG.

8). In this case the continuous groove 400a is obtained by milling the walls of the cavities or openings (FIG. 9) that is by milling at the zone conventional forming the beveled flanks for the lenses; in this case the groove 400a is formed to a greater depth then the blade in such a way as to permit the reinforcing blade 500a to be inserted to a position set back from the inside perimeter of said cavities 200a and 300a. Then in the nose bridging member a cross groove 800 is formed, this groove being open at the top and extending as far as the holes 200a-300a. Then into the thus formed grooves the reinforcing blade 500a is inserted and the single plate 100 is immersed into a basin containing an acetone or the like based solvent in order to cause the milled zones to soften. Then the grove 400a beyond the blade 500a is closed, by using a plastic strip or cord 900, as preliminarly softened by an acetone based solvent. In the nose bridging member groove 800 a block of the same material is inserted, sealing the opening.

Then, the plate is inserted into two templates provided with a beveled portion, as previously described, in such a way that the strip is able of sealing to the wall of the free cavity 400a and, finally, the operations of milling the glass beveled housing, and cutting and shaping by milling of the inside portion of the eyeglass frame front are carried out.

According to this embodiment of the instant eyeglass frame making method, the embodiment of the method which has been thereinabove described, may advantageously be used for making complete and reinforced eyeglass frame front portions starting alternatively from eyeglass frame front portions obtained by injection moulding, and free of the inner rib, also in this case being valid all the described operating steps of forming the reinforcing blade housing, sealing to one another the cut portions and forming the beveling for the glasses, both using said greater size hollow punches and by milling the inside of the eye housing (see FIG. 9).

Referring now to FIGS. 10 to 14 another embodiment of the eyeglass frame making method will be described, wherein, in addition to the frame, are formed, integral with the reinforcing blade or member, the two pins effective to fix the nose bearing pads.

Figure 10:
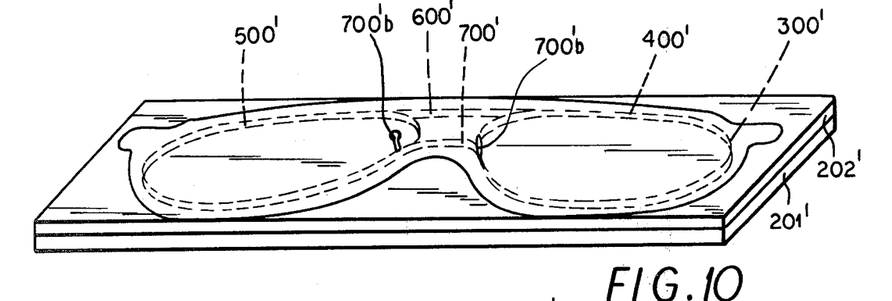
FIG. 10 illustrates by a perspective transparence view an eyeglass frame being prepared in the form of two mutually glued plastics material plates, according to a further variation of the instant eyeglass frame making method.
Figure 11A:
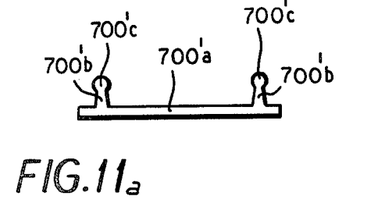
FIGS. 11a and 11b are detail views illustrating the eyeglass frame nose bridging portion provided with nose abutting pads and related blade.
Figures 11B, 12:
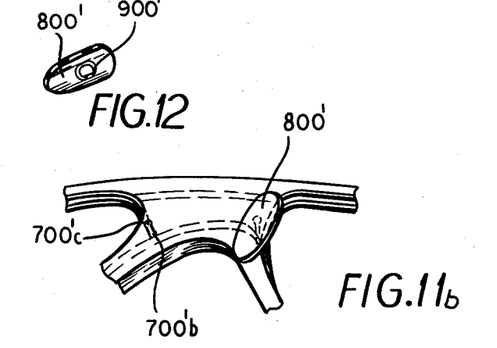
FIG. 12 illustrates a nose abutting or bearing pad.

More specifically, with reference to FIG. 10, the eyeglass frame is formed starting from two plates 201'-202' made of a plastics material, such as cellulose acetate, celluloid and the like, in one whereof is obtained, by means of a milling operation or the like, a groove 300' having the eyeglass frame shape and comprising, in a continuous way, all the frame portions, i.e. the two glass holding profiles 400'-500', the connecting member 600' and the nose bridging member 700', said groove being of such a size as to house a metal blade being manually inserted into said groove all along the perimeter thereof, thereby forming the reinforcing frame for the profiles 400' and 500' and the connecting member 600'.

The blade located in the groove 700' of the nose bridging member (see FIG. 11a) is provided with a rectilinear portion 700'a the two end portions 700'b thereof are perpendicular to the long portion and being provided with a head 700'c, said blade being inserted into the related groove 700' in such a way that the portions 700'b project outwardly, passing through suitable holes as provided in the covering plate 202' being superimposed on the plate 201' upon having inserted the overall metallic reinforcing member into the related groove and after having carried out a glueing step.

Then the eyeglass frame is cut from the two plates made integral to one another, in such a way as to permit the portions 700'b to project therefrom, thereby said portions 700'b form the pin members for the fixing of the swinging pads 800', these latter being provided with bendable hooks 900' (FIGS. 11b and 12) which are bent over the pins 700'b and retained by the provided heads 700'c.

Figures 13, 14:
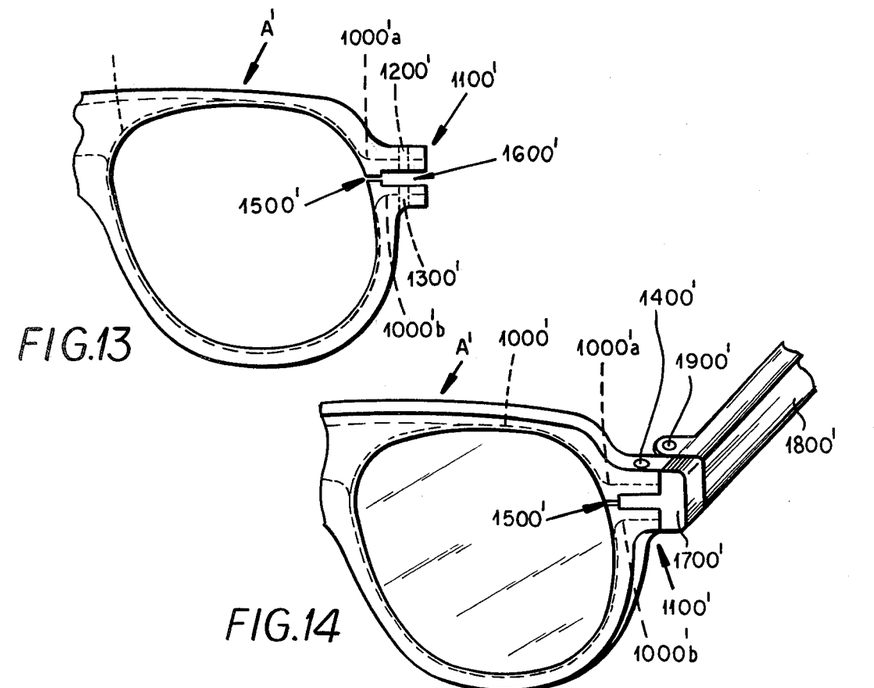
FIGS. 13 and 14 are respectively a front view and perspective view illustrating one end of the eyeglass frame, the reinforcing member being interrupted, and being provided a screw type of clamping engagement.

In FIGS. 13 and 14 is shown a side A' of the already cut eyeglass frame and, in this case, the reinforcing inside member 1000' is interrupted at the projection 1100', the two ends 1000'a-1000'b being bent over parallel to one another. It should be noted that in the parallel portions holes 1200'-1300' are provided one thereof being threaded for engaging the screw 1400' effective to recover the connection between the ends 1000'a-1000'b of the metallic reinforcing member.

The plastics material portion 1100' covering and comprising said metallic reinforcing member, is split by a cut 1500', being provided with a groove 1600' thereinto is inserted the fixed portion of a hinge 1700' locked to the projecting plastics portion 1100' by the same reinforcing member 1000' connecting screw 1400'.

The arm 1800' of the glasses supports the other portion of the hinge connected to the fixed portion of the pin 1900'.

It should be noted that this embodiment of the eyeglass frame making method according to the invention provides an eyeglass frame wherein it is possible to insert the glass into the related profile, by screwing off the screw 1400' in such a way as to cause the two sides of the profile to spread apart, owing to the presence of the split 1500'; then the glass may be locked in situ by screwing on said screw 1400'. It should furthermore be noted that it is possible to mount or replace the hinge 1700' or the overall arm of the glasses by screwing off said screw 1400', being also possible to easily replace the glass. Accordingly, the eyeglass frame making method of this embodiment provides an eyeglass frame having a single piece plastics material front portion in which is embedded a continuous metallic reinforcing member, and nose bearing pads swingably mounted on pins which are rigid with said metallic reinforcing member. As a further variation of this embodiment, the reinforcing metallic member and the plastics material can be interrupted and screw connected in order to mount and lock in situ both the glass and the hinge with the related glass arm.

Obviously, modifications and variations can be brought about in the embodiments of the inventive eyeglass making method which have been thereinabove illustrated only by way of indicative and not limitative examples for carrying out the invention.

I claim:

1. A method of making a reinforced eyeglass frame which comprises the steps of:
   (a) forming an outwardly open groove in an unperforated plate of celluloid or cellulose acetate to a depth less than the thickness of said plate and in a pattern such that said groove surrounds regions having the configuration of eyeglass lens and between said regions corresponding to a nose bridge;
   (b) inserting a metal reinforcing blade into said groove so that said blade surrounds said regions and extends between said regions;
   (c) sealing said groove outwardly of said blade around and between said regions whereby said blade is fully encapsulated in said plate;

(d) thereafter cutting out said regions to define lens-receiving openings surrounded by the fully encapsulated blade; and (e) cutting away said plate around and adjacent to said fully encapsulated blade to produce an eyeglass frame configuration having a nose bridge containing a length of the fully encapsulated blade.

2. The method defined in claim 1 wherein said groove is sealed outwardly of said blade by solvent softening of opposite sides of said groove and pressing said opposite sides together.

3. The method defined in claim 1 wherein said blade is sealed in said groove by inserting in said groove outwardly of said blade a plastic filler strip and bonding said filler strip in said groove.

4. The method defined in claim 1 wherein said groove is sealed outwardly of said blade by applying another plate of celluloid or cellulose acetate to the firstmentioned plate to overlie said groove and bonding the plates together.

5. The method defined in claim 1, claim 2, claim 3 or, claim 4 wherein said plate is beveled along said openings.

* * * * *